United States Patent
Gessner et al.

(10) Patent No.: US 10,774,238 B2
(45) Date of Patent: *Sep. 15, 2020

(54) METHOD FOR CURING A RMA CROSSLINKABLE RESIN COATING, RMA CROSSLINKABLE COMPOSITIONS AND RESINS FOR USE THEREIN

(71) Applicant: ALLNEX NETHERLANDS B.V., Bergen Op Zoom (NL)

(72) Inventors: Michael Anthony Gessner, La Grange, KY (US); Dirk Emiel Paula Mestach, Nijlen (BE); Ramesh Subramanian, Louisville, KY (US); William Jay Degooyer, Louisville, KY (US); Ajaya Nanda, Louisville, KY (US); Eric Matthew McCracken, Louisville, KY (US)

(73) Assignee: Allnex Netherlands B.V., Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/563,957

(22) PCT Filed: Apr. 18, 2016

(86) PCT No.: PCT/EP2016/058590
§ 371 (c)(1),
(2) Date: Oct. 3, 2017

(87) PCT Pub. No.: WO2016/166382
PCT Pub. Date: Oct. 20, 2016

(65) Prior Publication Data
US 2018/0163084 A1    Jun. 14, 2018

Related U.S. Application Data

(60) Provisional application No. 62/148,981, filed on Apr. 17, 2015.

(30) Foreign Application Priority Data

May 28, 2015  (EP) ................................... 15169719

(51) Int. Cl.
```
B05D 3/06      (2006.01)
C09D 167/08    (2006.01)
C08J 3/24      (2006.01)
C09D 5/00      (2006.01)
C08F 8/00      (2006.01)
C08L 67/08     (2006.01)
C08G 63/91     (2006.01)
```

(52) U.S. Cl.
CPC ........... *C09D 167/08* (2013.01); *B05D 3/067* (2013.01); *C08F 8/00* (2013.01); *C08G 63/914* (2013.01); *C08J 3/24* (2013.01); *C08L 67/08* (2013.01); *C09D 5/00* (2013.01); *C08J 2367/08* (2013.01)

(58) Field of Classification Search
CPC ........ C09D 167/08; C09D 5/00; C08G 63/914; B05D 3/067; C08J 3/24; C08J 2367/08; C08L 67/08; C08F 8/00
See application file for complete search history.

(56) References Cited

U.S. PATENT DOCUMENTS

| | | |
|---|---|---|
| 2,635,100 A | 4/1953 | Werntz |
| 2,759,913 A | 8/1956 | Hulse |
| 4,217,396 A | 8/1980 | Heckles |
| 4,223,072 A | 9/1980 | Baney et al. |
| 4,408,018 A | 10/1983 | Bartman et al. |
| 4,529,487 A | 7/1985 | Hsu et al. |
| 4,602,061 A | 7/1986 | Akkerman |

(Continued)

FOREIGN PATENT DOCUMENTS

| | | |
|---|---|---|
| CN | 1309683 A | 8/2001 |
| CN | 1637031 A | 7/2005 |

(Continued)

OTHER PUBLICATIONS

Japan Patent Office action in application JP 2017-554383 A, Mar. 31. 2020, 5 pages. (Year: 2020).*

(Continued)

*Primary Examiner* — William P Fletcher, III
(74) *Attorney, Agent, or Firm* — Hoyng Rokh Monegier LLP; David P. Owen

(57) ABSTRACT

A method for curing of a coating of RMA crosslinkable compositions, to RMA crosslinkable compositions and A method for curing of a coating of an RMA crosslinkable composition involving two or more different curing mechanisms, wherein the two or more different curing mechanisms involve a) RMA crosslinking in combination with a second crosslinking reaction between hydroxy groups on the RMA crosslinkable components with polyisocyanates or siloxanes; or b) RMA crosslinking in combination with a second crosslinking reaction with polyamines, with crosslinkable components comprising component B and/or with epoxy groups on the RMA crosslinkable components; or c) RMA crosslinking in combination with a second crosslinking reaction based on auto-oxidative drying of unsaturated groups on the RMA crosslinkable components; or d) RMA crosslinking in combination with a second radical crosslinking reaction of reactive components B on the RMA crosslinkable components; or f) combinations thereof.

10 Claims, No Drawings

(56) References Cited

U.S. PATENT DOCUMENTS

| | | |
|---|---|---|
| 4,749,728 A | 6/1988 | Craun et al. |
| 4,871,822 A | 10/1989 | Brindöpke et al. |
| 4,938,980 A | 7/1990 | Arciszewski et al. |
| 5,017,649 A | 5/1991 | Clemens |
| 5,084,536 A | 1/1992 | Brindöpke et al. |
| 5,959,028 A | 9/1999 | Irie et al. |
| 5,973,082 A | 10/1999 | Elmore |
| 5,990,224 A | 11/1999 | Raynolds et al. |
| 6,201,048 B1 | 3/2001 | Raynolds et al. |
| 6,262,169 B1 | 7/2001 | Helmer et al. |
| 6,265,029 B1 | 7/2001 | Lewis |
| 6,706,414 B1 | 3/2004 | Dammann et al. |
| 6,878,845 B2 | 4/2005 | Sheridan et al. |
| 6,989,459 B2 | 1/2006 | Walker |
| 7,514,528 B2 * | 4/2009 | Kauffman ............ C08F 220/26 528/302 |
| 7,524,435 B2 | 4/2009 | Bernard |
| 8,124,688 B2 | 2/2012 | Meijer et al. |
| 8,569,440 B2 | 10/2013 | Spyrou et al. |
| 8,829,151 B2 | 9/2014 | Meijer et al. |
| 8,962,725 B2 | 2/2015 | Brinkhuis et al. |
| 9,181,452 B2 | 11/2015 | Brinkhuis et al. |
| 9,181,453 B2 | 11/2015 | Brinkhuis et al. |
| 9,260,626 B2 * | 2/2016 | Brinkhuis .................. C08J 3/24 |
| 9,284,423 B2 | 3/2016 | Brinkhuis et al. |
| 9,534,081 B2 | 1/2017 | Brinkhuis et al. |
| 9,587,138 B2 * | 3/2017 | Brinkhuis .................. C08J 3/24 |
| 9,834,701 B2 * | 12/2017 | Brinkhuis .................. C08J 3/24 |
| 2003/0023108 A1 | 1/2003 | Walker |
| 2003/0195305 A1 | 10/2003 | Kuo et al. |
| 2004/0072979 A1 | 4/2004 | Sheridan et al. |
| 2005/0137275 A1 | 6/2005 | Nefzger et al. |
| 2005/0143575 A1 | 6/2005 | Bernard |
| 2006/0078742 A1 | 4/2006 | Kauffman et al. |
| 2007/0173602 A1 | 7/2007 | Brinkman et al. |
| 2007/0299206 A1 | 12/2007 | Cooper et al. |
| 2009/0143528 A1 | 6/2009 | Mestach et al. |
| 2009/0226729 A1 | 9/2009 | Niimoto et al. |
| 2011/0003937 A1 * | 1/2011 | Kontani ................ A61K 47/32 525/54.2 |
| 2011/0251338 A1 | 10/2011 | Kim et al. |
| 2013/0053505 A1 | 2/2013 | Brinkhuis et al. |
| 2013/0210986 A1 | 8/2013 | Brinkhuis et al. |
| 2013/0317156 A1 | 11/2013 | Yu |
| 2014/0088233 A1 | 3/2014 | Kann |
| 2014/0221542 A1 | 8/2014 | Brinkhuis et al. |
| 2014/0228507 A1 | 8/2014 | Brinkhuis et al. |

FOREIGN PATENT DOCUMENTS

| | | |
|---|---|---|
| CN | 1723242 A | 1/2006 |
| CN | 1757656 A | 4/2006 |
| CN | 1910234 A | 2/2007 |
| CN | 1964997 A | 5/2007 |
| CN | 1976972 A | 6/2007 |
| CN | 101012291 A | 8/2007 |
| CN | 101107289 A | 1/2008 |
| CN | 101268149 A | 9/2008 |
| CN | 101869844 A | 10/2010 |
| CN | 101879457 A | 11/2010 |
| CN | 102834436 A | 12/2012 |
| CN | 102834437 A | 12/2012 |
| CN | 103562328 A | 2/2014 |
| CN | 103974999 A | 8/2014 |
| DE | 835809 B | 4/1952 |
| DE | 3041223 A1 | 5/1981 |
| EP | 0161697 A1 | 11/1985 |
| EP | 0192304 A1 | 8/1986 |
| EP | 0198519 A1 | 10/1986 |
| EP | 0227454 A2 | 7/1987 |
| EP | 0310011 A1 | 4/1989 |
| EP | 0326723 A1 | 8/1989 |
| EP | 0448154 A1 | 9/1991 |
| EP | 0501223 A2 | 9/1992 |
| EP | 0651023 A2 | 5/1995 |
| EP | 0808860 A2 | 11/1997 |
| EP | 1513900 A1 | 3/2005 |
| EP | 1541606 A1 | 6/2005 |
| EP | 1593727 A1 | 11/2005 |
| EP | 1640388 A2 | 3/2006 |
| EP | 1641887 A1 | 4/2006 |
| EP | 1641888 A1 | 4/2006 |
| EP | 1761582 A1 | 3/2007 |
| EP | 1813630 A2 | 8/2007 |
| EP | 1838747 A1 | 10/2007 |
| EP | 1902081 A1 | 3/2008 |
| EP | 2072520 A1 | 6/2009 |
| EP | 2374836 A1 | 10/2011 |
| EP | 2556108 A1 | 2/2013 |
| EP | 2764035 A1 | 8/2014 |
| EP | 3085748 A1 | 10/2016 |
| GB | 2010879 A | 7/1979 |
| GB | 1596638 A | 8/1981 |
| GB | 2093472 A | 9/1982 |
| GB | 2405149 A | 2/2005 |
| JP | 53141369 A | 12/1978 |
| JP | S62223204 A * | 1/1987 |
| JP | H01204919 A | 8/1989 |
| JP | 8501124 A | 2/1996 |
| JP | 8319437 A | 12/1996 |
| JP | 1045993 A | 2/1998 |
| JP | H10330690 A | 12/1998 |
| JP | 2000119353 A | 4/2000 |
| JP | 2001505948 A | 5/2001 |
| JP | 2001516787 A | 10/2001 |
| JP | 2001516789 A | 10/2001 |
| JP | 2002514673 A | 5/2002 |
| JP | 2002285100 A | 10/2002 |
| JP | 2003522817 A | 7/2003 |
| JP | 200418859 A | 1/2004 |
| JP | 2004018859 A | 1/2004 |
| JP | 2004211090 A | 7/2004 |
| JP | 2005-034687 A | 2/2005 |
| JP | 2005-505653 A | 2/2005 |
| JP | 2006-089743 A | 4/2006 |
| JP | 2006525402 A | 11/2006 |
| JP | 2011-099744 A | 5/2011 |
| JP | 2011-208371 A | 10/2011 |
| JP | 2013-091982 A | 5/2013 |
| JP | 2013-108339 A | 6/2013 |
| JP | 2013528670 A | 7/2013 |
| JP | 2015120769 A | 7/2015 |
| JP | 5910952 B2 | 4/2016 |
| KR | 100232793 B1 | 12/1999 |
| NL | 8203502 A | 4/1984 |
| RU | 2275403 C2 | 4/2006 |
| RU | 2484113 C2 | 6/2013 |
| RU | 2532909 C2 | 11/2014 |
| SG | 11201401321 A | 8/2014 |
| TW | 200613500 A | 5/2006 |
| WO | 94017148 A | 8/1994 |
| WO | 9641833 A1 | 12/1996 |
| WO | 9825989 A1 | 6/1998 |
| WO | 9914275 A1 | 3/1999 |
| WO | 9914278 A1 | 3/1999 |
| WO | 9914279 A1 | 3/1999 |
| WO | 9958608 A1 | 11/1999 |
| WO | 0004106 A1 | 1/2000 |
| WO | 0112708 A1 | 2/2001 |
| WO | 02053613 A1 | 7/2002 |
| WO | 2003031502 A | 4/2003 |
| WO | 2004035632 A2 | 4/2004 |
| WO | 2004099329 A1 | 11/2004 |
| WO | 2005021672 A1 | 3/2005 |
| WO | 2005048866 A2 | 6/2005 |
| WO | WO-2005048866 A2 * | 6/2005 ........ C08F 222/1006 |
| WO | 2005104694 A1 | 11/2005 |
| WO | 2005104694 A2 | 11/2005 |
| WO | 2006003044 A1 | 1/2006 |
| WO | 2006081079 A1 | 8/2006 |
| WO | 2007035255 A1 | 3/2007 |
| WO | 2008070022 A1 | 6/2008 |
| WO | 2008157468 A1 | 12/2008 |

(56) References Cited

FOREIGN PATENT DOCUMENTS

| WO | 2011124663 | A1 | 10/2011 | | |
|---|---|---|---|---|---|
| WO | 2011124664 | A1 | 10/2011 | | |
| WO | 2011124665 | A1 | 10/2011 | | |
| WO | 2012002095 | A | 1/2012 | | |
| WO | 2012168385 | A2 | 12/2012 | | |
| WO | 2012175622 | A1 | 12/2012 | | |
| WO | 2013050622 | A1 | 4/2013 | | |
| WO | 2013050623 | A1 | 4/2013 | | |
| WO | 2013050624 | A1 | 4/2013 | | |
| WO | WO-2013050622 | A1 * | 4/2013 | ............... | C08J 3/24 |
| WO | 2014125589 | A | 8/2014 | | |
| WO | 2014166880 | A1 | 10/2014 | | |
| WO | 2016054367 | A1 | 4/2016 | | |
| WO | 2019145472 | A1 | 8/2019 | | |

OTHER PUBLICATIONS

Japan Patent Office action in application JP 2017-554366 A, Apr. 14, 2020, 8 pages. (Year: 2020).*

Noomen, Arie: "Applications of Michael addition chemistry in coatings technology", Progress in Organic Coatings, 32(1997), pp. 137-142.

T. Jung et al. Farbe und Lacke, Oct. 2003.

Krishnadas, Shashikiran et al., "Rapid Setting Epoxy Primer System with the Addition of Blocked Catalyst", Indian Journal of Advances in Chemical Science 2 (2014), pp. 55-60.

Lösungen, Römpp online 4.0, Mar. 1, 2002, with English machine translation.

"The Basics of Airless Spraying, Information on Basic Components, Spray Techniques and Safety", Graco, 2014.

Braun, D. et al., Polymer Synthesis: Theory and Practice, 4th ed., 2005, pp. 64-66.

Anonymus: "ETPPAAc Solutions Ethyltriphenylphosphonium Acid Acetate", Apr. 20, 2007, pp. 1-2.

Priority search report for EP10159253.3 completed on Mar. 10, 2011.

International Search Report and Written Opinion for PCT/EP2011/055463 dated May 30, 2011 and International Preliminary Report on Patentability (Ch. II) for PCT/EP2011/055463 completed on Jun. 25, 2012.

International Search Report and Written Opinion for PCT/EP2011/055464 dated Jun. 7, 2011 and International Preliminary Report on Patentability (Ch. II) for PCT/EP2011/055464 completed on Jun. 18, 2012.

International Search Report and Written Opinion for PCT/EP2011/055465 dated May 10, 2011 and International Preliminary Report on Patentability (Ch. II) for PCT/EP2011/055465 completed Jun. 18, 2012.

Priority search report for EP11184388.4 completed on Jul. 26, 2012, International Search Report and Written Opinion for PCT/EP2012/069798 dated Jan. 16, 2013 and International Preliminary Report on Patentability (Ch. I) for PCT/EP2012/069798 dated Apr. 8, 2014.

Priority search report for EP11184439.5 completed on Aug. 9, 2012.

International Search Report and Written Opinion for PCT/EP2012/069906 dated Dec. 10, 2012 and International Preliminary Report on Patentability (Ch. I) for PCT/EP2012/069906 dated Apr. 8, 2014.

International Search Report and Written Opinion for PCT/EP2012/069904 dated Jan. 15, 2013 and International Preliminary Report on Patentability (Ch. I) for PCT/EP2012/069904 dated Apr. 8, 2014.

Priority search report for EP11184426.2 completed on Aug. 9, 2012, International Search Report and Written Opinion for PCT/EP2012/069905 dated Jan. 15, 2013 and International Preliminary Report on Patentability (Ch. II) for PCT/EP2012/069905 completed on Dec. 10, 2013.

Priority search report for EP13162819.0 completed on Feb. 19, 2014, International Search Report and Written Opinion for PCT/EP2014/056953 dated May 2, 2014 and International Preliminary Report on Patentability (Ch. I) for PCT/EP2014/056953 dated Oct. 13, 2015.

Priority search report for NL2014666 completed on Mar. 10, 2016, International Search Report and Written Opinion for PCT/EP2016/058427 dated Jul. 7, 2016 and International Preliminary Report on Patentability (Ch. I) for PCT/EP2016/058427 dated Oct. 17, 2017.

Priority search report for EP15169717.4 completed on Nov. 17, 2015.

International Search Report and Written Opinion for PCT/EP2016/058517 dated Aug. 1, 2016 and International Preliminary Report on Patentability (Ch. I) for PCT/EP2016/058517 dated Oct. 17, 2017.

International Search Report and Written Opinion for PCT/EP2016/058525 dated Jul. 13, 2016 and International Preliminary Report on Patentability (Ch. I) for PCT/EP2016/058525 dated Oct. 17, 2017.

International Search Report and Written Opinion for PCT/EP2016/058540 dated Jul. 18, 2016 and International Preliminary Report on Patentability (Ch. I) for PCT/EP2016/058540 dated Oct. 17, 2017.

Search report for NL2014667 completed on Feb. 11, 2016, with English machine translation.

Priority search report for EP15169719.0 completed on Nov. 3, 2015.

International Search Report and Written Opinion for PCT/EP2016/058588 dated Jul. 12, 2016 and International Preliminary Report on Patentability (Ch. I) for PCT/EP2016/058588 dated Oct. 17, 2017.

International Search Report and Written Opinion for PCT/EP2016/058590 dated Jul. 25, 2016 and International Preliminary Report on Patentability (Ch. I) for PCT/EP2016/058590 dated Oct. 17, 2017.

Priority search report for EP15169722.4 completed on Aug. 19, 2015 and International Search Report and Written Opinion for PCT/EP2016/058483 dated Jun. 9, 2016 and International Preliminary Report on Patentability (Ch. I) for PCT/EP2016/058483 dated Oct. 17, 2017.

Search report for NL2014668 completed on Feb. 11, 2016, with English machine translation.

U.S. Appl. No. 14/989,961 (now U.S. Pat. No. 9,587,138) filed Jan. 7, 2016 (parent filing date Apr. 7, 2014).

JP Application No. 2014-533948 filed on Mar. 28, 2014 (effective filing date Oct. 8, 2012).

Brinkhuis, R.; Schutyser, J.; Thys, F.; De Wolf, E.; Buser, T.; Kalis, J.; Magnus, N.; Van Wijk, F. Taming the Michael Addition Reaction. European Coatings Journal 2015, 34-40. (Year: 2015).

Materials, "A_Guide_to_Silane_Solutions_Adhesives", Sep. 7, 2012, Internet Article, https://www.azom.com/article.aspx?ArticleID=6777.

* cited by examiner

US 10,774,238 B2

METHOD FOR CURING A RMA CROSSLINKABLE RESIN COATING, RMA CROSSLINKABLE COMPOSITIONS AND RESINS FOR USE THEREIN

CROSS REFERENCE TO RELATED APPLICATIONS

This application is a 371 of PCT application number PCT/EP2016/058590 filed on Apr. 18, 2016, which claims priority from EP application number 15169719.0 filed on May 28, 2015, and U.S. Provisional Application No. 62/148,981 filed on Apr. 17, 2015. All applications are hereby incorporated by reference in their entireties.

BACKGROUND OF THE INVENTION

The invention relates to a method for dual curing a RMA crosslinkable resin coating, to RMA crosslinkable compositions and to resins for use in the method. The RMA coating method and composition can be used for direct to concrete application, to wood coatings and coatings that are easy-to-clean, anti-graffiti and sanitisable coatings A variety of different types of resins are known in the prior art that can form the binder of a coating composition. The dominant technologies that are currently being used are epoxy-amine and polyol-polyisocyanate. Although these resin systems have their merits, they also pose some important limitations as the use chemicals that have toxicological profiles that are questionable (bisphenol A/F in epoxy resins, amine curing agents, monomeric diisocyanate in polyisocyanate hardeners). A further disadvantage of polyol-polyisocyanate floor coating systems is that, during the application, they are moisture sensitive. Epoxy-amine floor coating systems have a further disadvantage that they cannot be cured at relatively low temperatures below 15 or 10° C. which may often occur in outdoor applications. Consequently, there is a desire for a coating composition that has a more favorable toxicological profile, can be cured also at low temperatures and also in moist conditions.

Another important parameter for coating applications is the working time. This is the time following mixing of the basic ingredients during which the coating can be applied and finished without detrimental effect on its properties such as adhesion, compaction and surface finish. This property is very much linked to the consistency of the resin. Epoxyamine and polyol-polyisocyanate systems will start reacting chemically already in the liquid state directly after mixing. This implies that the viscosity of the mixed liquid resin flooring will start to increase, reducing the fluidity and the ability of the resin flooring to flow and level. Coating compositions having a good working time are known. For example alkyd resins have a good working time. However but take a rather long time to cure and fully develop the mechanical properties required for the end use (service time). This limits the use to relatively thin layers which harden faster than thick layers and also leaves a desire for better mechanical properties and chemical resistance of the resulting cured coating. Therefore there is still a desire for coating compositions with a more favorable balance of the counteractive requirements of working time and time to service.

Another desire is that the coating compositions have a low volatile organic content for safety, environmental and health reasons, in particular when applied in poorly ventilated circumstances, in particular indoor. This requirement is contra-active to achieving a higher fluidity and improved working time through the use of a volatile organic solvent. With volatile solvent herein is meant, unless otherwise described, the organic compounds having a boiling point below 250° C. present in the composition ready for use.

Apart from the above requirements the coating preferably also has a very good adhesion to the substrate and has a good water and chemical resistance, a high resistance to impact and abrasion, an optically attractive surface, a low dirt pickup- and adhesion and be easy to clean.

BRIEF DESCRIPTION OF THE INVENTION

There is a desire for improved coating compositions that do not have one or more of the above mentioned disadvantages of the prior art. In particular there is a desire for a resin for a method for curing RMA coating compositions having a better balance of properties in view of the above described requirements.

According to the invention one or more of the above mentioned problems are solved by a method for curing of a coating of a RMA crosslinkable composition involving two or more different curing mechanisms, said RMA crosslinkable composition comprising at least one crosslinkable component comprising reactive components A and B each comprising at least 2 reactive groups wherein the at least 2 reactive groups of component A are acidic protons (C—H) in activated methylene or methine groups (RMA donor group), and the at least 2 reactive groups of component B are activated unsaturated groups (C=C) (RMA acceptor group) which reactive groups react to achieve crosslinking by Real Michael Addition (RMA) reaction in the presence of a base catalyst (C), said method involving the steps of a. Providing a RMA crosslinkable composition
b. Applying a layer of said RMA crosslinkable composition
c. Allowing curing of the layer by RMA crosslinking
d. Before during or after said RMA crosslinking applying a second crosslinking reaction step, wherein the two or more different curing mechanisms involve a. RMA crosslinking in combination with a second crosslinking reaction between hydroxy groups on the RMA crosslinkable components with polyisocyanates or siloxanes or
b. RMA crosslinking in combination with a second crosslinking reaction with polyamines, with crosslinkable components comprising component B and/or with epoxy groups on the RMA crosslinkable components
c. RMA crosslinking in combination with a second crosslinking reaction based on auto-oxidative drying of unsaturated groups on the RMA crosslinkable components or,
d. RMA crosslinking in combination with a second radical crosslinking reaction of reactive components B on the RMA crosslinkable components and/or optional other radical crosslinkable polymer components, preferably by UV curing or by thermal curing preferably with peroxy, or
e. Combinations thereof wherein said second crosslinking reaction step is performed before, during or after the RMA curing.

The inventors have found that the method has very favorable properties in coating applications. RMA crosslinkable compositions were found to have very good properties for use in in highly demanding coating applications as for example in synthetic flooring and floor coating applications. Dual cure was found to increase overall conversion and will enhance Tg, XLD, easy to clean properties, chemical and mechanical resistance. Radiation curing in particular will enhance surface Tg, surface XLD, blocking resistance, EtC properties, chemical resistance.

In one embodiment of the method the RMA crosslinkable composition comprises a RMA crosslinkable resin containing one or more fatty components selected from the group of fatty acids, fatty alcohols, fatty amines, fatty thiols, preferably fatty acids or fatty alcohols, and at least 2 reactive groups which are acidic protons (C—H) in activated methylene or methine groups wherein the activated C—H reactive groups are in one or more reactive components A having a structure according to formula 1:

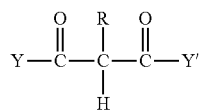

Formula 1 wherein R is hydrogen or an alkyl or aryl and Y and Y' are identical or different substituent groups, preferably alkyl, aralkyl or aryl (R*), or alkoxy (—OR*) or wherein the —C(=O)—Y and/or —C(=O)—Y' is replaced by CN or aryl, preferably by no more than one phenyl, preferably an acetoacetate or a malonate, most preferably a malonate.

The RMA crosslinkable resins comprises fatty compounds, preferably fatty acids, having unsaturated groups, epoxy groups or hydroxy groups or combinations thereof. Said fatty compounds, preferably fatty acids comprise C8 to C18 chain with 20, 25, 30 or 40 to 99 wt %, preferably 60 to 99 wt % of the fatty acids being unsaturated fatty acids for auto-oxidative crosslinking and wherein the RMA crosslinkable composition preferably also comprises a drier salt.

In another embodiment the RMA crosslinkable resin comprises fatty compounds, preferably fatty acids comprise a C8 to C18 chain with hydroxyl groups and/or comprise other hydroxyl groups on the crosslinkable components and the RMA crosslinkable composition further comprises polyisocyanates or siloxanes for crosslinking with the hydroxyl groups.

In another embodiment the RMA crosslinkable resin comprises fatty compounds, preferably fatty acids comprising a C8 to C18 chain with epoxy groups and the RMA crosslinkable composition further comprises polyamines.

In another embodiment the RMA crosslinkable composition comprises a thermal or radiation radical initiator for thermal or radiation radical crosslinking and optionally also an excess of reactive components B over reactive components A in the RMA crosslinkable composition.

In another embodiment the RMA crosslinkable composition comprises a radical initiator and crosslinking, preferably UV crosslinking, is done after RMA curing to achieve further reaction of unreacted component B in particular in the surface area of the coating.

In another embodiment the RMA crosslinkable composition comprises a radical initiator and crosslinking, preferably UV crosslinking, is done before RMA curing to increase the viscosity of the coating layer before RMA curing.

In another embodiment the RMA crosslinkable composition comprises more than 60 wt %, preferably more than 70, 80 or 90 wt % radical curable components, less than 40, preferably less than 30, 20 or 10 wt % of RMA crosslinkable components comprising component A, the sum thereof being 100 wt %, and a radical initiator and wherein crosslinking, preferably UV crosslinking, is done after an initial RMA curing to increase the viscosity of the coating layer before UV curing.

In another embodiment the RMA crosslinkable composition comprise acrylate as well as methacrylate acceptors as components B (acceptors).

The invention also relates to a RMA crosslinkable composition and to RMA crosslinkable resins as described herein.

Most preferred resins are RMA crosslinkable resins wherein the one or more reactive components A are predominantly malonate and the RMA crosslinkable resin has an hydroxy value OHV between 20-300, preferably 20-200 or 50-150, more preferably 75-125, most preferably 80-115. It was found that these resins have good potlife, adhesion and dry time properties. Particular preferred RMA crosslinkable resins comprise a reactive component A, preferably a malonate or acetoacetate, most preferably malonate, or comprising a reactive component B preferably an acryloyl, or both reactive components A or B is characterised by
 a) Molecular weight Mw (weight average) is between 1000-20000, preferably 2000-15000, more preferably 2500-10000
 b) Hydroxy value OHV is between 20-300, preferably 20-200 or 50-150, more preferably 75-125, most preferably 80-115
 c) Acid value AV is below 5, preferably below 3, 2 or even 1,
 d) Equivalent weight EQW (per C—H/C=C group) is between 85-1000, preferably 100-750, more preferably 125-500, 150-400 or even 175-300,
 e) Functionality defined as number average number of C—H/C=C groups per molecule is between 2-30, preferably 3-20, more preferably 4-12
 f) Glass transition temperature Tg=220-320K, preferably 230-300, more preferably 240-290, most preferably 250-280 (as measured by DSC at heating rate of 10 K/min).

These fatty resins have good easy to clean properties at higher Tg and crosslink density (ie lower EQW and higher functionality) in combination with fatty components.

DETAILED DESCRIPTION OF THE INVENTION

RMA crosslinkable compositions comprise at least one crosslinkable component comprising reactive components A and B each comprising at least 2 reactive groups wherein the at least 2 reactive groups of component A are acidic protons (C—H) in activated methylene or methine groups (RMA donor group), and the at least 2 reactive groups of component B are activated unsaturated groups (C=C) (RMA acceptor group). These reactive groups react to achieve crosslinking by Real Michael Addition (RMA) reaction between said at least one crosslinkable components in the presence of a base catalyst (C). Such RMA crosslinkable compositions are described in EP2556108. Herein a special catalyst C is described which is a substituted carbonate catalyst which decomposes in a coating layer to generate carbon dioxide which evaporates from the applied curing coating layer and a strong base which starts the RMA crosslinking reaction.

The RMA crosslinkable compositions comprising the resin of the invention compositions have a very good balance of working time and service time and also have improved coating properties like adhesion and appearance.

It is believed that the fatty acid backbone helps the RMA crosslinkable composition, to penetrate into porous substrates to seal them better and also to bring out better the vibrancy of colors of the substrate in un-pigmented coatings. It was further found that the RMA crosslinkable compositions comprising the resin of the invention have good adhesion and have very useful easy to clean properties.

The one or more reactive components A preferably predominantly comprise one type of reactive components, predominantly meaning that more than 50, 75, 90 and most preferably 100% of the C—H reactive groups in the crosslinkable component A are from one type of reactive component A and reactive component A preferably is a malonate, acetoacetate, acetylacetone, acetoacetamide or propionylacetate, most preferably a malonate.

The resin of the invention preferably is 1) a polyol oligomer or polymer modified with fatty acids and reactive component A or a fatty alcohol or fatty acid oil modified with reactive component A or 2) a polyester, polyurethane, acrylic, epoxy or polyether oligomer or polymer or hybrids or mixtures thereof modified with fatty acids and reactive component A and wherein the fatty acids and reactive component A are preferably bonded with ester bonds or 3) wherein the resin is an oligomer or polymer polyester, polyurethane, polyether, acrylic, epoxy, or polyol comprising hydroxyl groups and fatty acids, preferably an alkyd comprising fatty chains which is modified with reactive component A, preferably by esterification or trans-esterification, including polyesterurethane, polyesteramide In general the fatty components, preferably acids have a carbon length from 4-28, preferably from C6 to C18 and are preferably are derived from bio-based sources, preferably vegetable oil. In a particular embodiment the fatty acids comprise a C8 to C18 chain with less than 20, 15 or 10 wt % of the fatty acids being unsaturated fatty acids. It was found that the resin with these fatty acids has improved easy to clean properties as demonstrated in the examples. These compositions can be cured by radical cure of components B.

In another embodiment the resin of the invention comprises fatty components preferably acids comprising C8 to C18 chains with 20, 25, 30 or 40 to 99 wt %, preferably 60 to 99 wt % of the fatty acids being unsaturated fatty acids. This resin has dual cure properties and can be cured by RMA reaction as well as by reaction with the unsaturated bonds, for example by auto-oxidative or actinic radiation crosslinking.

In another embodiment the resin of the invention comprises fatty acids that comprise a C8 to C18 chain with hydroxyl groups or fatty acids that comprise a C8 to C18 chain with epoxy groups. This resin has dual cure properties and can be cured by RMA reaction as well as by reaction with the hydroxyl or epoxy groups, for example by crosslinking reaction with a co-component comprising polyamine, -isocyanate, -epoxy or -hydroxy. It is noted that multiple cure mechanisms can be used as well by combinations RMA with 2 or more of unsaturated, hydroxyl or epoxy groups. It is further noted that for dual or multiple cure properties C4-C28 or C6-C22 can also be used but C8-C18 is preferred only for practical reason of availability (coconut oil).

The RMA crosslinkable resin comprises fatty acids preferably in an amount of 5 to 80 wt %, preferably 10 to 60 wt % and most preferably 20 to 40 wt % relative to total weight of the RMA crosslinkable resin and comprises reactive components A in an amount between 1 and 80 wt %, preferably 5 to 70 wt % more preferably 10 to 40 wt % relative to total weight of the RMA crosslinkable resin.

An advantage of the RMA crosslinkable resin is also that it can be for a large part based on renewable resources. The fatty acids are preferably derived from bio-based resources, preferably vegetable oil. In a preferred embodiments the resin is based on alkyd which may have other bio-based components in particular polyols like glycerol. Ideally the resin may contain at least 30, preferably 40 or 50 wt % of the resin weight of components derived from renewable resources.

The RMA crosslinkable resin preferably has a weight average molecular weight Mw of at least 250 daltons and preferably is a polymer having Mw between 250 and 10000, more preferably between 400 and 5000 daltons and preferably a poly-dispersity between 2 and 5.

The RMA crosslinkable resin must have an acid value below 5, preferably below 4, 3, 2 and most preferably below 1 KOH/gr because the RMA crosslinking reaction is base catalyzed and acid components interfere with the base catalyst C and the acid base reaction between catalyst C and A and optionally D. The RMA crosslinkable resin is preferably prepared in a process comprising a) providing a resin comprising fatty components, preferably acid esters having an acid value below 5, preferably below 4, 3, 2 and most preferably below 1 KOH/gr and b) adding reactive component A preferably having at least one ester group and more preferably a malonate ester and 3) reacting at least a part of the reactive component A with the resin comprising fatty esters. This reaction is preferably a transesterification reaction.

The RMA crosslinkable resin can advantageously be used for the manufacture of—and as component in—a coating composition, an adhesive composition or a sealant composition.

The invention also relates to RMA crosslinkable composition comprising the RMA crosslinkable resin of the invention as described above and further comprising crosslinkable components comprising reactive components B comprising activated unsaturated groups (C=C) (RMA acceptor group) which crosslink by Real Michael Addition (RMA) reaction with the components A in the RMA crosslinkable resin in the presence of a base catalyst (C), wherein reactive component B preferably is an acryloyl group.

In a particular embodiment the RMA crosslinkable composition comprises the RMA crosslinkable resins of the invention comprising fatty acids having reactive functional groups, in particular crosslinkable groups, preferably selected from unsaturated groups, epoxy groups or hydroxy groups or combinations thereof, thus providing 2 or more different crosslinking mechanisms. The fatty acids having reactive functional groups can relatively easily be obtained by derivatising unsaturated bonds of unsaturated fatty acids. For example amine functional fatty acids would also be possible.

These compositions can be cured by RMA reaction as well as by reaction with the hydroxyl and/or epoxy groups, for example by crosslinking reaction with a co-component comprising polyamine, -isocyanate, -epoxy or -hydroxy. The invention accordingly also relates to a method for curing a coating composition comprising the RMA crosslinkable resin described above comprising a combination of two or more crosslinking reaction steps including a RMA crosslinking reaction step and one or more other crosslinking reaction steps selected from auto-oxidative, peroxy or radiation crosslinking performed before, during or after the RMA crosslinking reaction and in any order wherein curing can be done by RMA crosslinking and curing by hydroxyl reaction with polyisocyanates or siloxanes or curing is done by epoxy reaction with amines in any order.

In a particular embodiment the invention relates to a method for curing a coating composition comprising RMA crosslinkable resins in general, but preferably the RMA crosslinkable resins described herein, comprising a combination of two or more crosslinking reaction steps including a RMA crosslinking reaction step and a radical curing crosslinking step. The radical curing step can be a radiation or a thermal initiated radical curing step. In the radiation curing step radicals are created preferably by UV or with E-beam initiation. It may also be with daylight (VIS) which is also capable of curing. Radiation curing requires agents that create radicals on radiation. E-beam does not necessarily require radical forming agents. In case of thermal initiated radical curing a thermal radical initiator is used in the crosslinkable composition.

The order of the two crosslinking steps can vary for different reasons. The radical crosslinking step can be before, during or after the RMA crosslinking reaction step or combinations thereof as described in detail below.

The inventors have encountered a problem that can occur in curing RMA crosslinkable coating layers, in particular in thicker coating layers, typically having a dry thickness over 100 micron. The problem is that the mechanical and chemical properties of the coating are not as high as expected. It was found that the curing of the coating layer is not homogeneous throughout the thickness of the coating layer, in particular that the coating layer in the vicinity of the air interface have a too low crosslinking density. It is believed that this occurs as a result of vitrification through solvent evaporation, which will leave unreacted crosslinking functionality after full curing of the coating. This negatively properties like mechanical and chemical properties precisely where it is important for a coating: at its surface. Once this problem was identified it was found it could be solved by a subsequent radical curing. Therefore in a first embodiment of this method of the invention, the method for curing a coating composition involves a radical crosslinking step after the RMA crosslinking reaction step (post radical cure). This is done preferably with radiation, most preferably UV radiation.

The inventors have encountered another problem that can occur in curing RMA crosslinkable coating layers and in particular in thicker coating layers. The problem is that after application of the RMA crosslinkable coating composition sagging may occur which negatively impacts appearance. This problem could be solved by a radical curing/crosslinking step before the RMA crosslinking reaction step. The initial crosslinking induced by the radical increases the viscosity the uncured RMA crosslinkable coating layer before the RMA crosslinking reaction starts. Reactivity moderator D can be used to provide sufficient open time to also allow a first radical curing step. Care must be taken to not use up too much of the component B and disturb the RMA crosslinking with unbalanced stoichiometry. An excess of the radical crosslinkable components is preferably used for the amount expected to react in radical curing to maintain after radical curing a good balance of RMA reactive components A and B as herein described. This has at least one of the advantages of preventing sagging and achieving a more homogeneous crosslinking throughout the coating layer. Therefore in a second embodiment of this invention, the method for curing a coating composition involves a radical crosslinking step before the RMA crosslinking step to partially crosslink the coating layer before the RMA crosslinking reaction starts (pre radical cure). This method can also be used to produce matt or low gloss coatings. The dual cure method can also be a combination of the first an second embodiment: pre- and post cure.

The dual cure method involving both a RMA curing step and a radical curing step according to the first or second embodiment or both is also useful to coat substrates that need to be formed and where a flexible coating is needed, which involves a first curing step and a second curing step to increase Tg and XLD (lower flexibility) after the substrate forming process.

The first embodiment of the method can also be applied in a special circumstance and for another reason in a special third embodiment of this method. This method also involves a radical crosslinking step after the RMA crosslinking reaction step but is a method for radical curing of a UV curable coating composition which are typically low viscous, said UV curable coating composition also comprising RMA crosslinkable components and wherein a RMA crosslinking reaction step preceeds the radical curing step to partially cure the UV curable composition before the UV curing starts to quickly increase the viscosity, possibly up to formation of a gel to prevent sagging of the coating composition. This is particularly advantageous for UV curing of objects having a complex shape that have shade parts that cannot be easily irradiated. RMA crosslinkable components are useful in this application because the crosslinking reaction is very fast.

Compared to conventional radiation curing (UV), the RMA crosslinking provides an option for crosslinking shady parts, or thicker pigmented parts where pigments prevent penetration of UV light to deeper layers.

In the first embodiment the RMA crosslinkable composition comprises crosslinkable components having components A and B with functional groups C—H and C═C within the ranges as herein described. In the second embodiment the RMA crosslinkable composition comprises crosslinkable components having components A and B wherein functional groups C—H and C═C can be within the ranges as herein described, but preferably have a stoichiometric excess of reactive groups C═C in crosslinkable component B. In the third embodiment the UV curable coating composition comprises more than 60 wt %, preferably more than 70, 80 or 90 wt % UV curable components and less than 40, preferably less than 30, 20 or 10 wt % of RMA crosslinkable components comprising component A, the sum thereof being 100 wt %.

The radical curing can be carried out preferably by free radical curing using UV light, typically 200-400 nm light or electron beam using low energy electrons. In UV coatings people use UVA-TLO3 lamps early in the line to partially gel or vitrify the coating followed by full cure with UV-B to adjust the surface and full cure.

Photoinitiator must be added to absorb UV light and generate free radicals to start reaction between the activated unsaturated bonds, for example in acryloyl, such as in component B of the crosslinkable composition. E-beam curing does not require photoinitiator. Unsaturated bonds that are not activated such as in fatty acids are not so easy to radiation crosslink. Photoinitiators that can be used are known in the art and include Benzoin alkyl ethers; 4,4'-bis (diethylamino)benzophenone; Acetone and other ketones; Benzophenone and Thioxanthenone.

In a particular embodiment dual cure compositions comprise acrylate acceptors as well as methacrylate acceptors. The former will react well as RMA, the latter not so well, but are very usable for radical cure.

The RMA crosslinkable composition forms the most essential part, i.e. the binder system, of a coating composition. The RMA crosslinkable composition may further comprise additives which are relevant for the crosslinking reaction of the binder system, for example one or more reactivity moderators D, an alcohol as pot life improver, water, reactive solvents that are reactable with reactive component A or B, but also other additives like organic solvents T, sag control agents E, adhesion promotors P, and usual other coating additives like leveling agents, UV stabilisers, pigments, fillers etc. Water may improve pot life but preferably the water content is at most 5 wt %.

The catalyst C is mixed in shortly before the application and therefore the RMA crosslinkable composition is preferably in the form of a kit of parts comprising one or more parts I comprising a base catalyst C for initiating the RMA crosslinking reaction and one or more parts II not comprising said base catalyst C and comprising other remaining components of the RMA crosslinkable composition.

The invention accordingly also relates to a process for the coating of a substrate surface comprising mixing, shortly before application, the at least one parts I and II of the kit of parts of the RMA crosslinkable composition and applying a layer of the resulting composition on the substrate surface.

The invention also relates to the use of the RMA crosslinkable composition of the invention in coating compositions for application of a top-coating over a conventional sealer layer which is based on one or more resins including epoxy, phenolic, silane, silicone, acrylics, polyurethane, polyurea, polyaspartic resins and their hybrids.

Good results were obtained using the RMA crosslinkable composition for coating a wood floor, in particular a gymnasium floor, a concrete floor, a vinyl floor, terrazo floor, cork floor, phenolic floor or a metal floor. It was further found that the RMA crosslinkable composition can be used for direct coating on concrete floors without a sealer layer, which is very advantageous compared to polyol/isocyanate curing binder systems.

The invention relates in particular to the use of the above described RMA crosslinkable composition wherein the RMA crosslinkable resin comprises fatty acids with C8 to C18 chains with less than 20, 15 or 10 wt % unsaturated fatty acids for the manufacture of a coating composition having easy to clean properties, for use in particular in graffiti resistant coatings and in sanitizable coatings for hospital and toilet walls and floors. The examples show a distinct advantage over known RMA coatings.

RMA crosslinkable composition comprising the resin of the invention are suitable for a variety of coatings applications. These fatty acid modified resins containing reactive components A, in particular malonates, are suitable for use in a variety of coatings applications forming fast-drying, highly cross-linked films that can be formulated for tunable pot-life and good open-time balance.

Floor coatings with significantly longer pot life could be achieved having outstanding chemical resistance and abrasion resistance. This applies in particular to those compositions including effective amounts of reactivity moderating component D, achieving long potlife and short dry to touch time (or working time and service time). The invention further provides RMA compositions for use in floor coating compositions with low VOC, which is advantageous in view of Quality Environment Safety & Health (QESH) requirements, in particular for compositions containing specific reactive solvents which reduce viscosity but not contribute to VOC which is particularly useful for compositions with high particulate filler contents.

The composition presented in this invention is a two-pack (2K) system. A variety of 2K synthetic resin systems are available with the dominant technologies being acid-catalyzed amino cross-linked alkyds, epoxy-amine systems and polyol-polyisocyanate systems. The RMA crosslinkable resin and coating compositions thereof is faster drying plus develops hardness much more quickly than any of these other technologies. Plus, this invention is not sensitive to moisture as are the polyol-isocyanate systems. Pot-life is similar to amino cross-linked alkyds but is much longer than the epoxy-amine or polyol-polyisocyanate systems. This invention retains the good appearance and flow properties of amino crosslinked alkyds, but is formaldehyde-free. Epoxy-amine and polyol-isocyanate technologies both use chemicals that have questionable toxicological profiles: bis-phenol A/F in epoxy resins, amine curing agents, monomeric diisocyanate in polyisocyanate hardeners. Compared to these other 2K systems, this invention has a more favorable toxicological profile.

This invention also has applications in the areas where hygienic environments need to be maintained like hospitals, nursing care, surgery centers, rest rooms etc. Also high traffic public areas like schools, malls, airports need to be constantly cleaned and maintained well. Any coating that protects the surface that has the "easy to clean" characteristics provides advantage for the facility operator and owner. Moreover the coating will resist stains and aesthetically look good. The outstanding easy-to-clean property of the RMA crosslinkable resin of the invention is a very interesting advantage for coating applications in the above mentioned areas.

DETAILED DESCRIPTION OF THE INVENTION

Alkyd resins have been utilized in the coatings industry for years. They offer excellent applications properties including good flow, appearance and surface wetting to a variety of substrates. This is due to the oil/fatty acid content of alkyds which distinguish them from "oil-free" polyesters. The oils/fatty acids present in alkyds help to reduce the surface tension of the resin while internally plasticizing the resin giving flexibility and resistance to cracking/shrinkage with aging of the coating film.

The fatty acids and oils available for use in alkyds allows selectivity with regards to properties and functionality of the finished polymer. Oils and fatty acids with a higher level of unsaturation (e.g., linseed, tung) generally give better oxidative cure owing to higher levels of linoleic and linolenic acids. This unsaturation can also act as a reactive moiety in radiation curing additionally.

Oils/fatty acids with a higher level of conjugated unsaturation (e.g., dehydrated castor oil) will offer an even higher level of oxidative cure and better reactivity in radiation curing since the conjugation allows resonance stabilization of radicals creating during oxidation and radiation curing. So, the type of oil/fatty acid allows the formulator selectivity in terms of drying and curing properties.

Oils/fatty acids with lower levels of unsaturation, the so-called semi-drying oils (e.g. soybean oil, tall oil, sunflower oil) can still cure oxidatively and via radiation curing but at a lower level. This allows the formulator to incorporate harder segments and balance oxidative properties and radiation curing properties while still maintaining an open film surface. This can be advantageous for good solvent release.

Highly saturated oils/fatty acids (e.g. coconut oil, palm kernel oil, tallow) allow the formulator to utilize the good properties that oils impart in terms of flexibility and good film flow/appearance with a lower level yellowing upon aging of the coating. Plus, post-cure via oxidative cure can be reduced or eliminated with highly saturated oils/fatty acids which is desirable since in some instances this can lead to cracking and delamination. This is particularly important on more dynamic substrates such as wood. Functional oils such as castor (hydroxyl), vernonia (epoxy, naturally occurring), and epoxidized soybean oil (industrially produced) allow the formulator to build various crosslinking and dual-cure moieties into the alkyd polymer.

Reference is made to EP2556108 and EP2764035 for detailed description of components in the RMA crosslinkable composition A, B C or D, their preparation, the amounts used in the RMA crosslinkable composition as well as for measurement methods and definitions and the description thereof is hereby incorporated by reference and applicable unless described otherwise herein. Most important features are described below in summary.

It is preferred that reactive component A is malonate or acetoacetate and reactive component B is acryloyl. It is preferred that the one or more reactive components A in the crosslinkable component predominantly comprise one type of reactive components, predominantly meaning preferably more than 50, 75, 90 and most preferably 100% of the C—H reactive groups in crosslinkable component A are from one type of reactive component A, preferably from malonate or acetoacetate and most preferably consisting predominantly of malonate and acetoacetate or acetylacetone as the remainder component A. The most preferred reactive component B is an acryloyl.

The reactive components A and B are preferably build into a polymer chain or pending or terminal pending on a polymer chain. The RMA crosslinkable resin of the invention is one of the crosslinkable components comprising reactive component A. Optionally other crosslinkable components comprising reactive component A can be present. Preferably, the one or more other crosslinkable components are one or more polymers chosen from the group of polyesters, alkyds, polyurethanes, polyacrylates, epoxy resins, polyamides and polyvinyl resins which contain components A or B in the main chain, pendant, terminal or combinations thereof.

The relative amounts of the crosslinkable components in the RMA crosslinkable composition are chosen such that the molar ratio of activated unsaturated reactive group C═C in reactive component B to the activated acidic reactive groups C—H in reactive component A is between 0.5 and 2 and preferably between 0.75-1.5 or 0.8-1.2.

In case a reactive solvent is present having 2 C—H reactive groups (for example malonate) then these are also included in the total amount of C—H in the above ratio as they are crosslinkable components. If however monofunctional reactive solvents are used the C—H nor the C═C is taken into account for calculation of the ratio as they do not form part of the crosslinked network. Also the total amount of monofunctional material should be low, otherwise it will negatively affect coating properties. Preferably the total amount monofunctional reactive solvent is less than 10, preferably less than 5, 3 or even 2 wt %.

The RMA crosslinkable composition preferably further comprises a reactivity moderator D comprising an X—H group that is also a Michael addition donor reactable with component B under the action of catalyst C, wherein X is C, N, P, O or S or an alcohol with 2 to 12 carbon atoms or both for improving open time and hence working time of application of the floor coating composition on a floor.

The X—H group in component D, preferably an N—H group containing component, has a pKa (defined in aqueous environment) of at least one unit, preferably two units, less than that of the C—H groups in predominant component A, preferably the pKa of the X—H group in component D is lower than 13, preferable lower than 12, more preferably lower than 11, most preferably lower than 10; it is preferably higher than 7, more preferably 8, more preferably higher than 8.5.

The component D preferably comprises a molecule containing the N—H as part of a group —(C═O)—NH—(C═O)—, or of a group —NH—(O═S═O)— or a heterocycle in which the nitrogen of the N—H group is contained in a heterocyclic ring preferably chosen from the group of a substituted or unsubstituted succinimide, glutarimide, hydantoin, triazole, pyrazole, immidazole or uracil, preferably chosen from the group of succinimides, benzotriazoles and triazoles.

The component D is present in an amount between 0.1 and 10 wt %, preferably 0.2 and 7 wt %, 0.2 and 5 wt %, 0.2 and 3 wt %, more preferably 0.5 and 2 wt % relative to the total amount of the crosslinkable components A or B and component D. The component D is present in such amount that the amount of X—H groups in component D is no more than 30 mole %, preferably no more than 20, more preferably no more than 10, most preferably no more than 5 mole % relative to C—H donor groups from component A present in the crosslinkable polymer.

In case components D are present which also comprise reactive groups X—H and can react with B, the molar ratio of activated unsaturated reactive group C═C in reactive component B to the total number of reactive groups C—H in reactive component A and reactive groups X—H in component D is between 0.3 and 3, preferably 0.5-2 and even more preferably 0.75-1.5 or 0.8-1.2.

As described the RMA crosslinkable composition comprises catalyst C which is a base and mixed in only shortly before use of the flooring composition. The catalyst C can be a carbon dioxide blocked strong base catalyst, preferably a quaternary alkyl ammonium bi- or alkylcarbonate (as described in EP2556108). As this catalyst generates $CO_2$ it is preferred for use in coating layers with a thickness up to 500, 400, 300, 200 or 150 micrometer.

For compositions that are to be used in thick layers, in particular in high build and highly filled floor coating layers, the catalyst C is preferably a homogeneously active strong base catalyst, i.e. not of the surface deblocking type as described above. Preferably such catalyst is used in coating layers with a thickness from 150, 200 or 300 up to 2000, 1500, 1000 or 10,000 micrometer. An upper limit in thickness is in practice determined only by cost and intended use.

A suitable homogeneous catalyst C is the reaction product of an epoxide with a tertiary amine as described in EP0326723. The tertiary amine and epoxy components are combined during or shortly before combination of all components. Alternatively either the tertiary amine or epoxy are mixed with the combined components A and B and the remaining constituent of the catalyst is added thereto. The preferred epoxide components contain the epoxide group as glycidyl esters, glycidyl ethers, or epoxidation products of alpha olefins. A preferred tertiary amine is triethylene diamine.

A preferred homogeneous catalyst C is a salt of a basic anion X— from an acidic X—H group containing compound wherein X is N, P, O, S or C, and wherein anion X— is a Michael Addition donor reactable with component B and anion X— is characterized by a pKa(C) of the corresponding acid X—H of more than two units lower than the pKa(A) of the majority component A and being lower than 10.5. Details of this catalyst are described in WO2014166880A1, which is hereby incorporated by reference. This catalysts C is especially useful in applications in which there is no large surface available for allowing $CO_2$ to evaporate such as in the case of thick films applications.

In this case catalyst C is a salt according to formula Cat"1" X", wherein Cat"1" is a non-acidic cation, with no ability to inhibit the crosslinking reaction of components A and B. This implies that, if any protons are associated with the cation, their acidity does not exceed that of the dominant C—H functions in component A, by more than two units, preferably not more than 1 and more preferably not more than 0.5 pKa unit. Examples of useful cations include inorganic cations, preferably alkaline or alkaline earth metal cations, more preferably K+, Na+ and Li+, or organic cations like tetra-alkylammonium and tetra-alkylphosphonium salts, but also cations that do have a proton but are extremely non-acidic, for example protonated species of strongly basic organic bases as e.g. 1,8-Diazabicyclo[5.4.0]undec-7-ene (DBU), 1,5-Diazabicyclo[4.3.0]non-5-ene (DBN) or tetra-methylguanidine. These bases would be able to initiate the crosslinking reaction between components A and B but do not interfere with the reaction (inhibiting) in their protonated form.

An additional advantage of these catalyst components C is that they can be significantly less expensive than the known RMA latent base catalyst. For example, in most circumstances the cations that are required in carbon dioxide blocked latent base catalyst are of the tetra-alkylammonium type which are much more expensive. Because of the anion X— the salt component C has sufficient solubility even with simple and inexpensive cations like potassium.

In view of the fact that the RMA crosslinking reaction is base catalyzed, acidic components should not be used in the composition such that the acid base reaction between catalyst C and A and optionally D is not interfered. Preferably the composition is free of acidic components.

The RMA composition may comprise one or more organic solvents T required for dissolving certain components or for adjusting the RMA composition to an appropriate handling viscosity (eg for spraying application). Organic solvents for use in RMA crosslinkable compositions are common coating solvents that do not contain acid impurities like alkylacetate (preferably butyl or hexyl acetate), alcohol (preferably C2-C6 alcohol), N alkylpyrrolidine, glycolether, Di-propylene Glycol Methyl Ether, Dipropylene Glycol Methyl Ether, Propylene Glycol Methyl Ether Acetate, ketones etc.

The amount of volatile solvent can be between 0 and 60, 50 or 40 wt % but in view of QESH preferably the composition has a low volatile organic compounds (VOC) content and therefore the amount of volatile organic solvent is preferably less than 20, 15, 10, 5 and most preferably less than 2 or even 1 wt % relative to the total of the crosslinkable components A and B.

In particular where a low viscosity and a low VOC is required it is preferred that the RMA crosslinkable composition comprises one or more reactive solvents which react with crosslinkable components A or B. The one or more reactive solvents are preferably selected from the group of monomeric or dimeric components A, monomeric or dimeric components B, compounds A' having only 1 reactive acidic protons (C—H) in activated methylene or methine groups, compounds B' having only 1 reactive unsaturated groups (C=C), most preferably acetoacetate or malonate, most preferably malonate. The total amount of volatile organic solvent plus reactive solvents is between 0 and 30 wt % and the volatile organic solvent is less than 5 wt % relative to the total weight of the RMA composition.

The RMA crosslinkable composition can be used for different applications including coatings, adhesives, inks, synthetic resin flooring or as a binder in structural composites, but preferably is a coating composition (i.e. a paint) optionally comprising further usual coating additives as may required for the envisaged application.

EXAMPLES

The following is a description of certain embodiments of the invention, given by way of example only.

The examples relate to flooring compositions comprising a RMA crosslinkable alkyd resin and a carbondioxide blocked base catalyst which is a salt of a quaternary ammonium and an alkylsubstituted carbonate. Table 1 shows the catalyst composition.

Several malonated alkyds were synthesised as described in the examples 1-5 below. In Ex 1 the fatty acid was coconut fatty acid and reactive component A was dimethyl malonate. This resin is mainly based on saturated fatty acids with low yellowing tendency. In Ex 2 the fatty acid was Soybean oil fatty acid and reactive component A was diethyl malonate. This resin has significant amount of unsaturation and can be used in RMA cure and dual cure applications, in particular auto-oxidation as the secondary cure mechanism. In Ex3 and Ex 4 the fatty acid was based on castor oil and reactive component A was dimethyl malonate. This resin has the functional hydroxyl group in the chain and can be used in isocyanate-hydroxyl cure along with RMA cure. Other hydroxyfunctional crosslinkable components can have high hydroxyl values, and can be used in NCO (co-)cure. This is not specific to the OH functional fatty resin. In Ex 5 the fatty acid was coconut fatty acid and epoxidized Soybean methyl ester and reactive component A was dimethyl malonate. This resin has the functional epoxy groups in the chain and can be used in epoxy-amine cure along with RMA cure.

The components B of the RMA crosslinkable composition are TMPTA or DiTMPTA, which were mixed in the formulation as a pre-mix with the pigment paste or separately or both. Table 2 lists the components of the coating compositions.

Example1

Malonated Alkyd 1

A three-liter, four-necked reaction flask equipped with a condenser, agitator, heating mantle, sampling tube, thermocouple attached to a thermowatch and toluene-primed Dean-Stark trap was charged with 349.91 parts coconut fatty acid, 395.47 parts trimethylolpropane, 62.73 parts pentaerythritol, 100.10 parts of phthalic anhydride, 93.60 parts of Adipic acid and 0.94 parts of dibutyltin oxide and sparged with nitrogen at 0.5 standard cubic feet per hour (SCFH) for 15 minutes without agitation followed by 15 minutes with agitation. The reaction mixture was then heated to 450-455° F., discontinuing the nitrogen flow at the onset of distillation. The mixture was held at 450-455° F. for an acid value of <1 adding toluene as needed to maintain a steady reflux. Once the acid value was reached, the mixture was cooled to 180° F. under a nitrogen blanket. 742.89 parts of dimethyl malonate were added to the reaction mixture, a packed column was added to the reactor and the Dean-Stark trap drained. The resin was heated to 330° F. and held until methanol distillation ceased. The nitrogen sparge was then increased to 2.0 SCFH to remove the azeotrope solvent and the resin cooled and filtered. The resulting malonate-functional resin contained 11.4% residual dimethyl malonate and had a Gardner-Holdt viscosity of Z1-Z2 with an acid value of 0.5 and an APHA color of 98. The number average molecular weight was 1490 with a weight average molecular weight was 8530.

Example 2

Malonated Alkyd 2

A four-necked reaction flask equipped with a condenser; agitator; heating mantle; addition funnel; thermocouple attached to a control box (Love control series 32A); and primed Dean-Stark trap with toluene, was charged with 26.4 parts (by weight) of Soybean oil fatty acid, 29.9 parts of trimethylol propane, 4.7 parts of pentaerythritol, 14.3 parts of phthalic anhydride, 0.07 parts of dibutyltin oxide, and heated under 0.5 SCFH (standard cubic feet per hour) (0.014 m3 hr-1) nitrogen flow to 165° C. At 165° C., water started to distil azeotropically. The reaction temperature was increased to 230° C. and maintained at such temperature until an acid value of <1.0 was attained. The alkyd was cooled to 110° C. To this resin, 37.7 parts of diethyl malonate was added and the temperature was increased to 150° C. Minimum amount of toluene was added to distil ethanol azeotropically. At 150° C., ethanol started to distil out. The reaction temperature was increased to 180° C. and maintained at this temperature to collect all the ethanol. Once the ethanol stop coming, the reaction was cooled; Nitrogen flow was increased to 2 SCFH (0.057 m3 hr-1) to remove all the toluene.

The resulting resin had 96% non-volatile material (NVM); density 9.38 lb/gallon, Gardener-Holdt viscosity of Z6-Z7, an acid value of 0.37; a number average molecular weight (Mn) of 2100; a weight average molecular weight (Mw) of 9000; and a polydispersity of 4.3.

Example 3

Malonated Alkyd 3

A three-liter, four-necked reaction flask equipped with a packed column, toluene-primed Dean-Stark Trap, condenser, agitator, heating mantle, sampling tube and thermocouple attached to a thermowatch was charged with 917.97 parts of castor oil, 532.20 parts of trimethylolpropane, 108.30 parts of pentaerythritol, 327.60 parts of phthalic anhydride and 2.50 parts of dibutyltin oxide and the contents sparged with nitrogen at 0.5 SCFH for 15 minutes without agitation and another 15 minutes with agitation. The contents of the reactor were then heated to 375-380° F. discontinuing the nitrogen sparge once distillation began. The mixture was held at 375-380° F. for an acid value of <1 adding toluene as needed to maintain a steady reflux. Once the acid value was reached the reactor was cooled to 300° F. with a 0.5 SCFH nitrogen blanket. 831.70 parts of dimethylmalonate were then added to the resin and the Dean-Stark trap drained. The reaction mixture was then heated to 330° F. collecting the methanol as it distilled off and held at 330° F. until the reaction was complete. The packed column was then removed and the nitrogen sparge was increased to 2.0 SCFH to distill off the azeotrope solvent at which point the reaction mixture was cooled and filtered. The resulting malonate-functional alkyd resin contained 4.1% residual dimethyl malonate. The resin had a viscosity of 350,000 cPs and an APHA color of 332.

Example 4

Malonated Resin 4

A three-liter, four-necked reaction flask equipped with a packed column, condenser, unprimed Dean-Stark trap, agitator, heating mantle, thermocouple attached to an automatic temperature controller was charged with 919.75 parts castor oil and 369.98 parts of dimethyl malonate and heated to 330° F. under a nitrogen blanket at 0.5 SCFH. The nitrogen flow was discontinued at the onset of distillation. The resin was held at 330° F. until methanol distillation ceased at which point it was cooled and filtered. The resulting resin was 90.5% NVM in dimethyl malonate with a viscosity of 600 cps, an acid value of 1.5 and an APHA color of 551.

Example 5

Malonated Alkyd 5

A four-necked reaction flask equipped with a condenser; agitator; heating mantle; addition funnel; thermocouple attached to a control box (Love control series 32A); and primed Dean-Stark trap with toluene, was charged with 21.4 parts (by weight) of coconut fatty acid, 29.2 parts of trimethylol propane, 11.6 parts of phthalic anhydride, 0.07 parts of dibutyltin oxide, and heated under 0.5 SCFH (standard cubic feet per hour) (0.014 m3 hr-1) nitrogen flow to 165° C. At 165° C., water started to distil azeotropically. The reaction temperature was increased to 230° C. and maintained at such temperature until an acid value of <1.0 was attained. The alkyd was cooled to 110° C. To this resin, 30.9 parts of dimethyl malonate was added and the temperature was increased to 180° C. Minimum amount of toluene was added to distil methanol azeotropically. At 150° C., methanol started to distil out. The reaction temperature was kept at 180° C. to collect all the methanol. Once the ethanol stop coming, the reaction was cooled to 110° C. To this resin 20.2 parts of methyl epoxy soyate is added. The temperature increased to 180° C. Methanol started to distil out due to the transesterification of methyl ester at the chain end. The reaction was held at 180° C. to distill out all methanol. The nitrogen flow was increased to 2 SCFH (0.057 m3 hr-1) to remove all the toluene while cooling. The epoxy functional malonated alkyd was filtered and stored. The resulting resin had 98% non-volatile material (NVM); density 9.40 lb/gallon, Gardner-Holdt viscosity of Z5-Z6, an acid value of 0.42; a number average molecular weight (Mn) of 2500; a weight average molecular weight (Mw) of 8500; and a polydispersity of 3.4.

Example A

Preparation of Catalysts 1-3

The catalysts 1 and 2 are carbondioxide blocked tetrabutyl ammonium ethyl- and methylcarbonate catalysts respectively and were prepared as described in EP2556108 (catalyst C5). The composition is listed in Table 1:

| Component | Catalyst 1 | Catalyst 2 |
|---|---|---|
| Aqueous TBAH (55%) | 44.60 | 0 |
| TBAH (40%) in Methanol | 0 | 80 |
| DI Water | 4.90 | 0 |
| Diethylcarbonate | 20.10 | 0 |
| Dimethylcarbonate | 0 | 17.2 |
| n-propanol | 30.40 | 0 |
| Methanol | 0 | 13 |

Preparation of Catalyst 3

Catalyst 3 is a homogeneous base catalyst according to WO2014166880A1. A magnetic stirrer was put into a flask containing 74.26 g of ethanol. With gentle mixing, 17.49 g of benzo-triazole was added and then 8.25 g of KOH was slowly added. The solution was warmed to 49° C. and mixed for two hours to make KBZT catalyst (Catalyst 3). The base concentration was determined by titration to be 1.324 meq/g.

Coating Formulations were prepared from the components mentioned in Table 2 below by mixing the components and pre-dissolved components as indicated. The coating formulations do not contain catalyst yet. This is added later. The usual coating additives not explicitly identified and described are well known commercially available components for levelling, anti-foaming (Foamstar ST-2446), surfactants (Byk 310: 315 1:4), colorants (Chroma Chem 844-9955), surface modifiers (Silmer ACR-D2).

Example B2

100 grams of Formulation B was mixed with 6.49 grams of Catalyst 3 and then applied onto a steel panel. The paint was thoroughly dry after 40 minutes. The potlife of the mixed paint was less than 1 hour. The next day Konig Pendulum Hardness was determined to be greater than 40 seconds. MEK resistance was determined to be greater than 100 double-rubs hence shows good chemical resistance.

Example C1

100 grams of Formulation C was mixed with 2.72 grams of Catalyst 2 and 0.5 g of photo-initiator Darocur 4265 and then applied onto a steel panel. The panel was thoroughly dry after 40 minutes. The potlife of the mixed paint was over than 4 hours. The panel was stored in the dark overnight. The next day half of the panel was masked and the whole panel was exposed to UV light. Konig Pendulum Hardness was determined; the un-exposed paint had a hardness of 24 seconds and exposed area had a hardness of 29 seconds. The percent residual Acryloyl was determined to be 57% for the un-exposed paint and 44% for the exposed paint.

Example C2

100 grams of Formulation D was mixed with 2.72 grams of Catalyst 2 and 0.5 g of photo-initiator Darocur 4265 and then applied onto a steel panel. The panel was thoroughly dry after 40 minutes. The potlife of the mixed paint was over

TABLE 2

| | Paint Formula | | | | | | | |
|---|---|---|---|---|---|---|---|---|
| | A | B | C | D | E | F | G | H |
| Malonated Coconut-Alkyd 1 | 41.33 | 30.43 | 44.61 | 15.57 | 47.3 | 47.08 | 31.03 | 0 |
| Malonated Soya-Alkyd 2 | 0 | 0 | 0 | 0 | 0 | 0 | 0.00 | 48.24 |
| Tri AcetoAcetate | 7.29 | 0.19 | 0 | 0 | 8.32 | 0 | 0.20 | 8.48 |
| Pigment Paste 1* | 0 | 59.23 | 0 | 0 | 0 | 0 | 60.40 | 0 |
| Miramer M300 | 15.42 | 0 | 0 | 0 | 35.25 | 0 | 0.00 | 33.96 |
| Miramer M410 | 18.83 | 0.13 | 22.92 | 0 | 0 | 24.19 | 0.13 | 0 |
| Setalux 17-7101 (n-butylacetate)** | 0 | 0 | 0 | 84.33 | 0 | 0 | 0.00 | 0 |
| Silmer ACR-D2 Pre-dissolve | 0.12 | 0.09 | 0.09 | 0.1 | 0.05 | 0.16 | 0.09 | 0.06 |
| 1,2,4-Triazole | 0 | 0.35 | 0 | 0 | 0 | 0 | 0.51 | 0 |
| N-Methyl Pyrrolidone Subsequently add | 0 | 0.56 | 0 | 0 | 0 | 0 | 0.83 | 0 |
| ChromaChem 844-9955 | 0 | 0 | 0 | 0 | 0 | 0 | 0.99 | 0 |
| Methyl Propyl Ketone | 17.02 | 9.01 | 32.38 | 0 | 0 | 0 | 0.00 | 0 |
| n-Butyl Acetate | 0 | 0 | 0 | 0 | 0 | 28.56 | 0.00 | 0 |
| 2-Propanol | 0 | 0 | 0 | 0 | 0 | 0 | 0.00 | 9.26 |
| n-Butanol | 0 | 0 | 0 | 0 | 9.08 | 0 | 5.82 | 0 |
| TOTAL | 100.0 | 100.0 | 100.0 | 100.0 | 100.0 | 100.0 | 100.0 | 100.0 |

*Pigment Paste 1 mix 32.0% of Miramer M410 with 65.1% of Kronos 2310 and 2.9% of disperbyk 163 and grind until the particle size is smaller than 10 µm A
**Polymeric Acryloyl

Example B1

100 grams of Formulation A was mixed with 5.82 grams of Catalyst 3 and then applied onto a steel panel. The paint was thoroughly dry (method?) after 40 minutes. The potlife of the mixed paint was less than 1 hour. The next day Konig Pendulum Hardness was determined to be greater than 30 seconds. MEK resistance was determined to be greater than 100 double-rubs hence shows good chemical resistance.

than 4 hours. The panel was stored in the dark overnight. The next day half of the panel was masked and the whole panel was exposed to UV light. Konig Pendulum Hardness was determined; the un-exposed paint had a hardness of 22 seconds and exposed area had a hardness of 41 seconds. The percent residual Acryloyl was determined to be 28% for the un-exposed paint and 19% for the exposed paint. Hence the increased conversion of the double bonds was determined to be due to exposure to UV radiation of the panels and the hardness had increased MEK resistance was determined to be greater than 100 double-rubs hence shows good chemical resistance.

Example D1

100 grams of Formulation E was mixed with 5.12 grams of Catalyst 1 and then applied onto a steel panel. The paint was thoroughly dry after 40 minutes. The potlife of the mixed paint was over 4 hours. The next day Konig Pendulum Hardness was determined to be greater than 40 seconds. MEK resistance was determined to be greater than 100 double-rubs hence shows good chemical resistance.

Example D2

100 grams of Formulation F was mixed with 3.49 grams of Catalyst 2 and then applied onto a steel panel. The paint was thoroughly dry after 40 minutes. The potlife of the mixed paint was over 4 hours. The next day Konig Pendulum Hardness was determined to be greater than 20 seconds. MEK resistance was determined to be greater than 100 double-rubs hence shows good chemical resistance.

Example D3

100 grams of Formulation G was mixed with 2.85 grams of Catalyst 1 and then applied onto a steel panel. The paint was thoroughly dry after 30 minutes. The potlife of the mixed paint was over 4 hours. The next day Konig Pendulum Hardness was determined to be greater than 40 seconds. MEK resistance was determined to be greater than 100 double-rubs hence shows good chemical resistance.

Example D4

100 grams of Formulation H was mixed with 5.14 grams of Catalyst 1 and then applied onto a steel panel. The paint was thoroughly dry after 40 minutes. The potlife of the mixed paint was over 4 hours. The next day Konig Pendulum Hardness was determined to be greater than 40 seconds. MEK resistance was determined to be greater than 100 double-rubs hence shows good chemical resistance.

A Pigmented Formulation Z, Curable by RMA, Was Formulated as Indicated Below.

Malonated Polyester MPE1

MPE1 is prepared as follows: Into a reactor provided with a distilling column filed with Raschig rings were brought 382 g of neopentyl glycol, 262.8 g of hexahydrophthalic anhydride and 0.2 g of butyl stannoic acid. The mixture was polymerised at 240° C. under nitrogen to an acid value of 0.2 mg KOH/g. The mixture was cooled down to 130° C. and 355 g of diethylmalonate was added. The reaction mixture was heated to 170° C. and ethanol was removed under reduced pressure. The resin was further cooled and diluted with butyl acetate to 85% solids, to yield a material with OH value 16 mg KOH/g, GPC Mn 1750, and a malonate equivalent weight of 350 (active C—H EQW 175).

For the MPE1S material, the synthesis of MPE1 was used, now adding 11.2 g of succinimide at 140C to allow full dissolution.

The catalyst 4 (CAT4) composition (base content 0.928 mmole/g)

| Component | Catalyst C |
|---|---|
| Aqueous TBAH (55%) | 100 |
| Diethylcarbonate | 45.1 |
| n-propanol | 181 |

| Component | Paint Z |
|---|---|
| MPE1 | 139.4 |
| MPE1S | 192.2 |
| Pigment paste* | 565.5 |
| Pre-dissolve: | |
| 1,2,4-triazole | 4.8 |
| n-propanol | 27.0 |
| Subsequently add | |
| Byk 310:315 1:4 | 2.8 |
| Tinuvin 292 | 4.6 |

*The composition of pigment paste: 320.3 grams of DiTMPTA, 650.7 g of Kronos 2310 pigment, with 29 g of Disperbyk 163

Next, the formulations A, B and C were made. DEAEA stands for 2-(diethylamino)ethylacrylate, functioning as coinitiator with benzophenone.

| Sample | P-Z (g) | CAT4t (g) | Propanol (g) | BuAc (g) | Benzophenone (g) | DEAEA (g) | Total (g) |
|---|---|---|---|---|---|---|---|
| A | 50 | 1.33 | 2.08 | 2.95 | 0 | 0 | 56.36 |
| B | 25.00 | 0.67 | 1.04 | 1.48 | 0.12 | 0.17 | 28.48 |
| C | 25.00 | 0.67 | 1.04 | 1.48 | 0.36 | 0.51 | 29.06 |

Films were applied to be cured under ambient conditions, either at a dry layer thickness of approximately 50 mu (index 2), or of 75 mu (index 3). Typically in this formulation, acryloyl conversion can be determined by FTiR (809 cm$^{-1}$ C=C peak integration) to be high (>90%) at the substrate side, but limited at the outermost top surface. After a day of ambient drying in daylight, the following values were determined

| Sample | Top Conversion (%) |
|---|---|
| A2 | 47 |
| A3 | 43 |

After a day of drying in daylight, this was also done for the B and C compositions including the photoinitiating ability; also, these were checked again after a 30 minutes exposure to a UV lamp (CleanLight 75 watt, UV C, 30 cm distance). It can be seen that after a day in daylight top side conversions are higher than the comparative examples A2 and A3. Additional UV exposure lead to a further rise in conversion. A higher conversion of the outermost part of the film, through additional radical reaction, will lead to a higher Tg and XLD, and accompanied expected better chemical and mechanical resistances.

| Sample | UV time (mins) | Top Conversion (%) | Sample | UV time (mins) | Top Conversion (%) |
|---|---|---|---|---|---|
| B2 | 0 | 65 | B3 | 0 | 58 |
| B2 | 30 | 72 | B3 | 30 | 61 |
| C2 | 0 | 62 | C3 | 0 | 57 |
| C2 | 30 | 71 | C3 | 30 | 71 |

TABLE 3

| Paint Formula | I | J | K | L | M | N |
|---|---|---|---|---|---|---|
| Malonated Alkyd 6 | 58.60 | 0 | | 0 | | |
| Malonated Alkyd 7 | 0 | 59.76 | 0 | 0 | | |
| Malonated Alkyd 8 | 0 | 0 | 59.76 | 0 | | |
| AcAc Alkyd 11 | | | | 59.72 | | |
| Malonated Alkyd 9 | | | | | 59.48 | |
| Malonated Alkyd 10 | | | | | | 59.48 |
| Tri AcetoAcetate | 0 | 0 | 0 | 0 | 0 | 0 |
| Pigment Paste 1* | 0 | 0 | 0 | 0 | 0 | 0 |
| Miramer M300 | 29.69 | 30.28 | 30.28 | 31.23 | 30.28 | 30.28 |
| BYK 3550 Pre-dissolve 1,2,4-Triazole Subsequently add | 0 | 0.29 | 0.29 | 0.27 | 0.27 | 0.27 |
| n-Butyl Acetate | 4.23 | 2.04 | 2.04 | 1.15 | 2.34 | 2.34 |
| n-Propanol | 7.48 | 7.63 | 7.63 | 7.63 | 7.63 | 7.63 |
| n-Butanol | 0 | 0 | 0 | 0 | 0 | 0 |
| TOTAL | 100.0 | 100.0 | 100.0 | 100.0 | 100.0 | 100.0 |

*Pigment Paste 1 mix 32.0% of Miramer M410 with 65.1% of Kronos 2310 and 2.9% of Disperbyk 163 and grind until the particle size is smaller than 10 μm A

| Paint Formula with catalyst | Paint Formulations without catalyst | % active —CH group in the resin prepared using Acetoacetate | CH Equivalent weight | Hydroxyl Equivalent Weight | Potlife (hours) | Color (RT cure) "b" | Stage 3 Dry (min.) Clear | KPH (air dry) | KPH (baked) | MEK Double rubs air dry | MEK Double rubs baked 150 F. |
|---|---|---|---|---|---|---|---|---|---|---|---|
| D7 | I | 0 | 175 | 550 | 7 | 2.14 | 24 | 48 | 88 | 158 | 230 |
| D8 | M | 10 | 175 | 550 | 2 | 4.86 | 47 | 69 | 62 | 221 | 284 |
| D9 | N | 30 | 175 | 550 | 1 | 5.51 | 51 | 79 | 59 | 208 | 320 |
| D10 | L | 100 | 175 | 550 | <1 | 8.08 | >60 | 37 | 40 | 204 | 226 |

Use Examples D5 and D6 for Dual Cure
(Isocyanate and RMA Cure Coating Examples)

Example D5

100 grams of Formulation I was mixed with 3.7 grams of Catalyst 2 and then applied onto a steel panel. The paint was observed to be thoroughly dry after 40 minutes. MEK resistance was determined to be 137 double-rubs which shows good chemical resistance.

Example D6

100 grams of Formulation I was mixed with 3.7 grams of Catalyst 2 and 49 g of Desmodur N3390 isocyanate trimer and mixed thoroughly. This paint was applied to a steel panel. The paint was observed to be thoroughly dry after 40 minutes. MEK resistance was determined to be greater than 230 double-rubs which shows good chemical resistance. The following table illustrates why the malonate group is the preferred source of —CH for the polymers claimed in this patent.

In addition to malonate the acetoacetate moiety can also be used in combination with the malonate groups in the polymer up to a level of 30% acetoacetate to adjust pot-life and dry-time. Above 30% acetoacetate modification in the polymer the films made with these polymers show an unacceptable level of yellowing. In all the four formulations shown below the —CH equivalent weight is kept constant at 175 (regardless of the —CH source) with a hydroxyl equivalent weight of 550.

To prepare coating formulations D7 to D10, 5.32 g of Catalyst 1 was added to 100 g each formulations I, M, N and L and mixed well. They were then applied on pre-treated steel substrate and evaluated.

The effect of —OH groups in the polymer backbone can be illustrated in the table below. As the amount of —OH groups decreases the pot life decreases and drytime shortens. OHV 140 corresponds to EQW 400. Double the EQW means half the OHV.

To prepare coating formulations D7, D11 and D12, 5.32 g of Catalyst 1 was added to 100 g each formulations I, J and K and mixed well. They were then applied on pre-treated steel substrate and evaluated.

| Paint Formula with catalyst | Paint Formulations without catalyst | CH Equivalent weight | Hydroxyl Equivalent Weight | Pot-life (hours) | Stage 3 Dry (min.) Clear | KPH (air dry) | KPH (baked) | MEK Double rubs air dry | MEK Double rubs baked 150 F. |
|---|---|---|---|---|---|---|---|---|---|
| D7 | I | 175 | 550 | 7 | 24 | 48 | 88 | 158 | 230 |
| D11 | J | 175 | 1000 | 4 | 7 | 79 | 89 | 207 | 276 |
| D12 | K | 175 | 2000 | 3.5 | 2 | 46 | 79 | 190 | 220 |

What is claimed is:

1. A method for curing of a coating of an RMA crosslinkable composition comprising two or more different curing mechanisms, said RMA crosslinkable composition comprising at least one crosslinkable component comprising one or more reactive components A and B each comprising at least 2 reactive groups wherein the at least 2 reactive groups of component A are acidic protons C—H in activated methylene or methine groups, and the at least 2 reactive groups of component B are activated unsaturated groups C=C which reactive groups react to achieve crosslinking by Real Michael Addition reaction in the presence of a base catalyst C, said method comprising the steps of:
   a. providing the RMA crosslinkable composition;
   b. applying a layer of said RMA crosslinkable composition to a substrate;
   c. allowing curing of the layer by RMA crosslinking by reacting the acidic protons (C—H) in activated methylene or methine groups with the activated unsaturated groups (C=C) by RMA crosslinking in the presence of the base catalyst (C);
   d. after said applying and before, during, or after said RMA crosslinking performing a second crosslinking reaction step;
wherein the two or more different curing mechanisms comprise:
   a. RMA crosslinking in combination with a second crosslinking reaction between hydroxy groups on the RMA crosslinkable components with polyisocyanates or siloxanes; or
   b. RMA crosslinking in combination with a second crosslinking reaction with polyamines, with crosslinkable components comprising component B and/or with epoxy groups on the RMA crosslinkable components; or
   c. RMA crosslinking in combination with a second crosslinking reaction based on auto-oxidative drying of unsaturated groups on the RMA crosslinkable components; or
   d. RMA crosslinking in combination with a second radical crosslinking reaction of reactive components B on the RMA crosslinkable components; or
   e. combinations thereof.

2. The method of claim 1, wherein the RMA crosslinkable composition comprises an RMA crosslinkable resin containing one or more fatty components selected from the group of fatty acids, fatty alcohols, fatty amines, fatty thiols, and at least 2 reactive groups which are acidic protons C—H in activated methylene or methine groups wherein the activated C—H reactive groups are in one or more reactive components A having a structure according to formula 1:

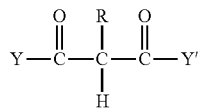

Formula 1 wherein R is hydrogen or an alkyl or aryl and Y and Y' are identical or different substituent groups, or wherein the —C(=O)—Y and/or —C(=O)—Y' is replaced by CN or aryl.

3. The method according to claim 2, wherein the fatty compounds in the RMA crosslinkable resin are selected from the group consisting of fatty compounds having unsaturated groups, epoxy groups, hydroxy groups, and combinations thereof.

4. The method according to claim 3, wherein the fatty compounds are fatty acids comprising C8 to C18 chain with 20, 25, 30 or 40 to 99 wt% of the fatty acids being unsaturated fatty acids for auto-oxidative crosslinking.

5. The method according to claim 3, wherein the fatty compounds are fatty acids comprising a C8 to C18 chain with hydroxyl groups and/or comprise other hydroxyl groups on the crosslinkable components and the RMA crosslinkable composition further comprises polyisocyanates or siloxanes for crosslinking with the hydroxyl groups.

6. The method according to claim 3, wherein the fatty compounds are fatty acids comprising a C8 to C18 chain with epoxy groups and the RMA crosslinkable composition further comprises polyamines.

7. The method according to claim 3, wherein the RMA crosslinkable composition comprises a thermal or radiation radical initiator for thermal or radiation radical crosslinking.

8. The method according to claim 7, wherein the RMA crosslinkable composition comprises an excess of the one or more reactive components B over the one or more reactive components A in the RMA crosslinkable composition, wherein the RMA crosslinkable composition comprises more than 60 wt% radical curable components, less than 40 wt% of RMA crosslinkable components comprising component A, the sum thereof being 100 wt%, and a radical initiator and, wherein crosslinking is done after an initial RMA curing to increase the viscosity of the coating layer before UV curing.

9. The method according to claim 7, wherein the RMA crosslinkable composition comprise acrylate as well as methacrylate acceptors as the one or more reactive components B.

10. The method of claim 1, wherein the one or more reactive components A are predominantly malonate, predominantly meaning that more than 50% of the C—H reactive groups in the reactive components A are from malonate.

* * * * *